O. OLSEN.
PNEUMATIC PRESSURE GAGE.
APPLICATION FILED JUNE 1, 1911.
1,041,336.
Patented Oct. 15, 1912.
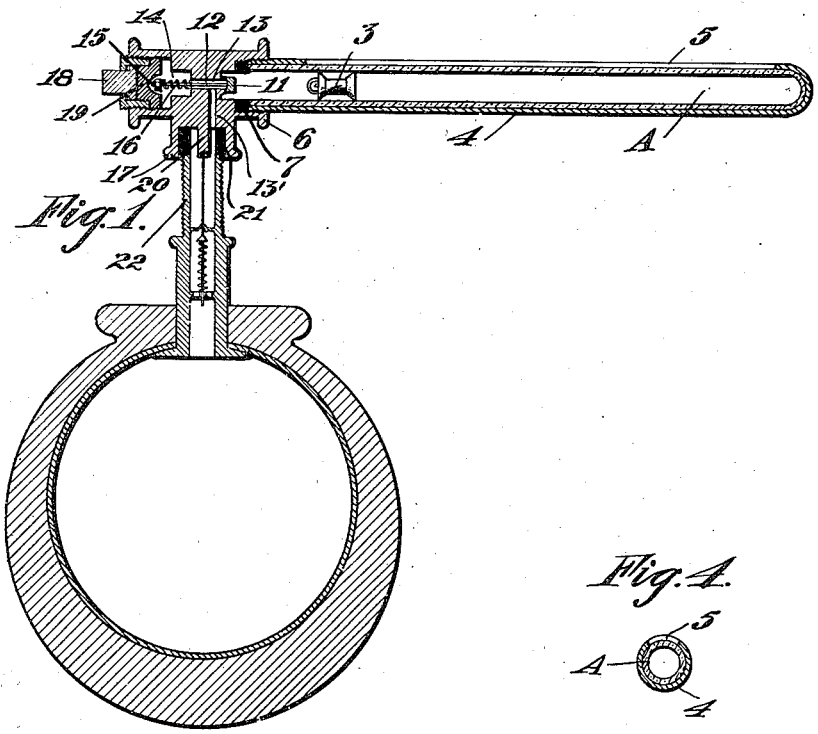
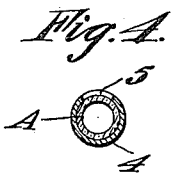
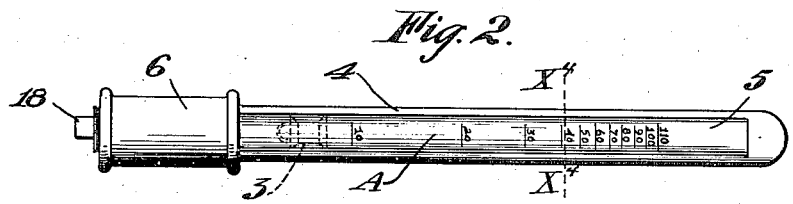
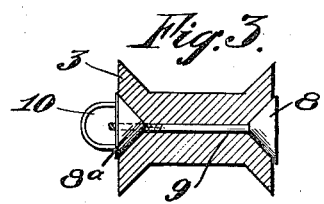
Witnesses:
R. S. Berry,
Thos. Castbery
Inventor:
Ole Olsen,
By G. H. Strong.
His Atty.

UNITED STATES PATENT OFFICE.

OLE OLSEN, OF OAKLAND, CALIFORNIA, ASSIGNOR OF ONE-HALF TO HARRISON T. CARVIN, OF ALAMEDA, CALIFORNIA.

PNEUMATIC-PRESSURE GAGE.

1,041,336.     Specification of Letters Patent.     Patented Oct. 15, 1912.

Application filed June 1, 1911. Serial No. 630,608.

*To all whom it may concern:*

Be it known that I, OLE OLSEN, a citizen of the United States, residing at Oakland, in the county of Alameda and State of California, have invented new and useful Improvements in Pneumatic-Pressure Gages, of which the following is a specification.

My invention relates to improvements in pneumatic pressure gages.

It is especially designed for determining pressures, and is particularly applicable to determining pressure in the tires of automobiles, and in like places where air is held under compression, and where it is desired to ascertain the exact amount of pressure.

It is the object of this invention to provide a gage which can be easily and quickly applied, and which is so constructed and arranged that the amount of pressure registered thereon may be determined after the device has been removed from the point of application.

It consists in a combination of parts, and in details of construction which will be more fully explained by reference to the accompanying drawings, in which—

Figure 1 is a sectional elevation, showing the application of the device. Fig. 2 is a plan view of the device. Fig. 3 is a detail view of the piston or plunger in section. Fig. 4 is a section on line $x^4$—$x^4$ Fig. 2.

A is a tube which may be made of glass or other transparent material; or may have a portion made transparent for the purpose of inspection, one end of which tube is closed while the other end is open. Within the tube is a piston or plunger 3, and this plunger fits snugly within the tube so that a body of air is confined between the plunger and the closed end of the tube. The open end of the tube is adapted to be fitted to the part containing the fluid under pressure, and which pressure it is desired to exactly ascertain; the present invention residing in the means for connecting the tube to the source of pressure.

It will be manifest that when pressure is admitted into the open end of the tube it will force the plunger upward, and will compress the air in the sealed portion of the tube until the two pressures on the opposite side of the plunger are substantially equal. By reading indicating marks, which are placed on the inner wall of a containing tube 4 surrounding the glass tube A, with which marks the top of the plunger coincides, the amount of pressure will be at once indicated.

The tube 4 is provided for convenience of construction, and to protect the fragile glass tube, and may be made of metal, hard rubber, or other suitable material. This tube has one side made open, as shown at 5, so that the position of the plunger 3 can be readily ascertained and so as to disclose the indicating marks which are marked on the inner wall of the tube 4 opposite the opening 5.

In order to maintain the plunger 3 tight, and to regulate it in case of leakage, I have shown a cone 8 which fits a conical depression in one end of the plunger 3. This cone has a screw threaded stem 9 which extends through the center of the plunger 3, and is adapted to receive a second cone $8^a$ which also fits in a corresponding depression in that end of the plunger. This cone may conveniently be provided with a ring or loop 10 by which it can be turned. The parts then being assembled, it will be seen that by screwing the cone $8^a$ upon the stem 9, the two cones will be drawn toward each other, and the elastic plunger will be correspondingly expanded and caused to fit as closely as may be desired within the tube A. In this manner, if any leakage occurs or undesirable change in position of the plunger, the latter may be adjusted and made tight so that it will again operate accurately when pressure is applied to it.

The end of the tube 4, corresponding to the open end of the glass tube A, is screwed into a valve casing 6; the ends of the tubes A and 4 bearing against a washer 7 in the casing 6 to form an air-tight joint.

Mounted in the casing 6 is a valve 11 which normally rests on a crown seat in the casing and opens to the interior of the glass tube A. The stem 12 of the valve 11 extends through a passage 13 in the casing 6 and projects into an enlarged space 14 in the end of the casing and has a nut 15 screwed on its outer end; the nut 15 forming an abutment against which a helical spring 16, wound on the stem 12, bears to normally retain the valve 11 in a seated position.

The valve 11 is designed to close the passage 13, from whence a passage 13' leads from the passage 13 in a direction at right angles thereto and opens to the atmosphere through a guide flange 17 formed on the side of the casing 6. The purpose of the valve 11 is to trap air delivered to the interior of the tube A, as later described, so that the plunger 3 will be retained in any position it may assume.

Means are provided for operating the valve 11 to release the trapped air, which means consists of a push-button 18 mounted in the end of the casing 6 adjacent to the end of the valve-stem 12. A rubber cap 19 is disposed in the space 14 between the end of the stem 12 and the inner face of the push-button 18 as a means for preventing the escape of air at this point when the device is applied.

From the center of the guide flange 17 a pin 20 extends axially downward, and its lower end is preferably made concave. The guide flange 17 has a washer 21 on its inner wall and is adapted to rest upon the tube 22 of the pneumatic air valve which is employed in connection with pneumatic tires. When the device is applied, the portion of the casing 6 inclosed by the flange 17 is placed upon the end of the valve tube 22, as shown in Fig. 1, and forms a joint therewith; the fixed pin 20 contacting with the stem of the air valve to unseat the latter and allow air from the tire to pass through the passages 13—13', open the valve 11 and enter the interior tube A. This compressed air instantly forces the plunger outward within the tube A until compression equal to that within the tire has been formed in the closed end of the tube. The valve 11 then closes by virtue of the spring 16 so that the device may be removed. The amount of compression is then read by the position of the plunger with relation to the graduations upon the tube.

The elastic sleeve or washer 21 which fits into the flanged projection on the casing 6 serves to form a joint between the casing 6 and the valve-containing tube 22, so that by simply pressing the device upon said tube and at right angles thereto, with the flange 17 surrounding the upper end of the tube 22, a tight joint is formed, and the valve is simultaneously unseated to allow the amount of compression to be shown as above described.

By this construction I am enabled to dispense with all supplemental springs or projecting gage rods or stems, and to provide means for instantly and accurately adjusting the device and maintaining the plunger in a tight working condition.

The plunger 3 is preferably coated with a suitable phosphorescent substance, such as glue, or lacquer mixed with phosphorus, for the purpose of enabling it to be inspected at night.

From the foregoing it will be seen that the registered pressure can be read after removing the device from the tube 22, for the reason that the pressure employed in actuating the plunger 3 will be trapped by the valve 11.

The device is restored to normal by pressing the push-button 18 to release the pressure on one side of the plunger 3. The compressed air on the other side of the plunger in expanding to normal will return the plunger 3 to its original position.

A great improvement is effected by disposing the visible index or gage tube at right angles with the air valve and stem of the tire, since the valve stem casing projects to a considerable distance radially from the inner periphery of the wheel rim, and the gage tube is necessarily of such length that in small automobile wheels there is not sufficient room between the rims and hub to accommodate the gage tube.

By this construction which causes the tube to extend horizontally outward between the wheel spokes, plenty of space is provided, and the gage marks are much more easily read.

Having thus described my invention, what I claim and desire to secure by Letters Patent is—

1. A pressure gage for pneumatic tires, including a gage-tube and a fixed valve-opening pressure-pin, a casing fixed to the gage-tube and carrying the pressure-pin, said casing adapted to form a joint with a tire-valve tube, a plunger within the gage-tube movable by the admission of compressed air into said tube, and a valve controlling the communication between the gage-tube and the tire valve tube, said valve closing outwardly and adapted to trap the air in said gage-tube and maintain the pressure in the tube when said tube is removed from the tire-valve tube.

2. A pressure gage for pneumatic tires including a gage-tube and a fixed valve-opening pressure-pin at right angles with each other, a casing fixed to the gage-tube and carrying the pressure-pin, said casing adapted to form a joint with the tire-valve tube, a plunger movable by the admission of compressed air into said gage-tube, a valve between the inlet end of the gage-tube and the discharge end of the tire-valve tube and adapted to open to admit air from the tire into the gage-tube, said valve adapted to close automatically to trap the air in the gage-tube and maintain the pressure in said tube when the gage-tube is removed from the tire-valve tube, and a push button adapted to unseat the valve from the outside to release the trapped air and allow the plunger to return to normal position.

In testimony whereof I have hereunto set my hand in the presence of two subscribing witnesses.

OLE OLSEN.

Witnesses:
CHARLES EDELMAN,
D. B. VALENTINE.